UNITED STATES PATENT OFFICE.

LUDWIG HATSCHEK, OF VOCKLABRUCK, AUSTRIA-HUNGARY.

METHOD OF FACILITATING AND ACCELERATING THE HARDENING OF HYDRAULIC CEMENTS.

974,138.  Specification of Letters Patent.  Patented Nov. 1, 1910.

No Drawing.  Application filed December 17, 1909. Serial No. 533,575.

*To all whom it may concern:*

Be it known that I, LUDWIG HATSCHEK, a subject of the Emperor of Austria-Hungary, residing at Vocklabruck, in the Empire of Austria-Hungary, have invented certain new and useful Improvements in Methods of Facilitating and Accelerating the Hardening of Hydraulic Cements; and I do hereby declare the following to be a full, clear, and exact description of the invention, such as will enable others skilled in the art to which it appertains to make and use the same.

The object of this invention is to facilitate and accelerate the hardening of hydraulic cements in the course of the drying out thereof.

In the course of the manufacture of artificial stone employing hydraulic cement, according to an invention of mine, in which the cement is, first, swelled up or pulped, and rendered adhesive, by treatment with a great bulk of water as set forth in my Reissue Patent No. 12,594, and, then, put up in layers, when there are layers sufficient to afford the desired thickness, the mass, thus produced, and in the form of a slab is, with others of its kind, stacked in a press with a metallic plate between every two slabs, and pressed, after which, the stack is taken out and placed apart for the slabs to set and harden. Upon removal from the press, the slabs are, of course, hot, and are still moist. In the hardening, heat and moisture are necessary to insure good results, and, as the plates conduct away the heat, and the moisture becomes dissipated, heat and moisture have been supplied extraneously by adduction of steam. Not only, however, does this involve a separate and circumstantial operation, but the supply of steam is apt to cause efflorescence, or spotting, and blistering of the product, probably from dissolving out of lime by superabundant moisture and unequal heating of the plates. I overcome the difficulty by placing the slabs, after pressing, in a close, or hermetically sealed chamber, box, or vessel, whereby the heat is conserved, and the slabs, themselves, supply, automatically, the requisite moisture. The heat may, favorably, be held at 100° to 120° F., more or less, as requisite. By this operation, not only is the procedure of hardening facilitated, but the hardening is greatly accelerated, a result which it may require 4 weeks to bring about, sometimes being achieved in 24 hours; and not only is the product devoid of efflorescence, or spots, but there is no sticking of the cement to the plates, which are then readily removed, leaving an unblistered and smooth surface.

Having, thus, fully described my invention, what I claim and desire to secure by Letters Patent is:

The method of facilitating and accelerating the hardening of hydraulic cement products, which consists in placing them, after pressing and still moist, in a close chamber, or vessel, allowing them there to hold their own heat and present the requisite moisture, and keeping them at the proper temperature until hard, substantially as described.

In testimony whereof, I affix my signature, in the presence of two subscribing witnesses.

LUDWIG HATSCHEK.

Witnesses:
R. G. DYRENFORTH,
H. T. WURRBURGER.